Feb. 10, 1970    G. S. BOTT ET AL    3,494,097
RAKE-TYPE TRAY LOADER

Filed Dec. 11, 1967    2 Sheets-Sheet 1

INVENTORS.
GEORGE SPENCER BOTT
WILLIAM PETER KONAZEWSKI
BY

ATTORNEY

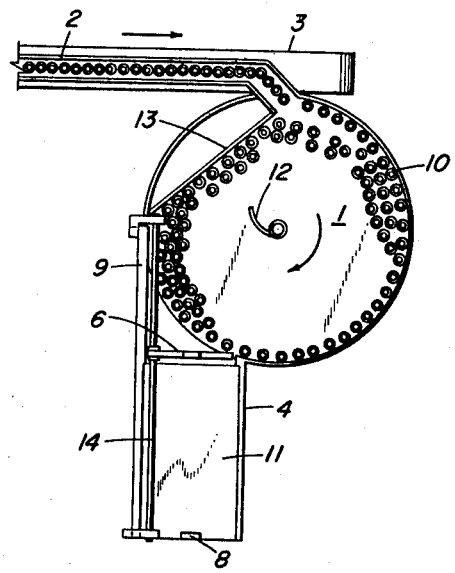
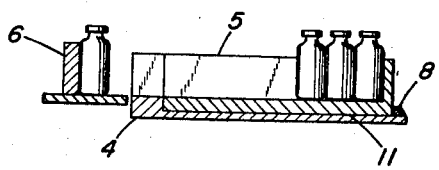
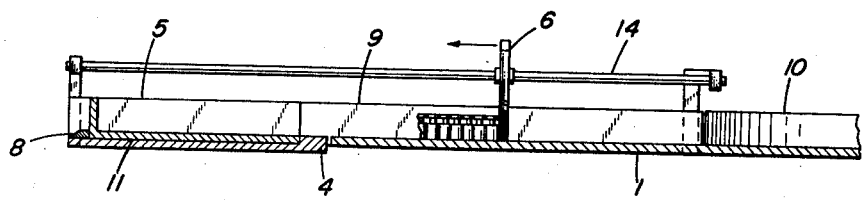

# United States Patent Office 3,494,097
Patented Feb. 10, 1970

3,494,097
RAKE-TYPE TRAY LOADER
George Spencer Bott, Westwood, N.J., and William Peter Konazewski, Pearl River, N.Y., assignors to American Cyanamid Company, Stamford, Conn., a corporation of Maine
Filed Dec. 11, 1967, Ser. No. 689,702
Int. Cl. B65b *35/40, 35/46*
U.S. Cl. 53—244                                 3 Claims

ABSTRACT OF THE DISCLOSURE

A tray loader for loading vials, bottles and similar containers comprises a conveyor for feeding the containers onto a rotating turntable, a shelf at one side of the turntable at substantially turntable level with a depressed portion dimensioned to receive a three-sided tray, the depression being sufficient so that the bottom of the tray is maintained at turntable level. The turntable and two sides of the shelf to thereby push containers from the turntable into the tray are provided with walls sufficiently high so that containers are held, one of the walls of the shelf extending tangent to the turntable. A rake is provided slideable along this last wall and of travel sufficient to move to the rear of a tray on the shelf.

BACKGROUND OF THE INVENTION

A number of vial filling and/or capping machines have been designed, for example, a multi-station machine described and claimed in the co-panding application of Taylor et al., Ser. No. 562,620, filed July 5, 1966. The machine is provided with a conveyor, as most machines are, and after the vials are filled and/or capped a complicated device moves the vials laterally off the conveyor and pushes them onto a tray row by row. Other machines have provided manual tray loading and the like. In every case the operation is either complicated or slow or both, and there is still a need for a rapid tray loader.

SUMMARY OF THE INVENTION

Essentially the present invention provides a rotating turntable onto which vials or other containers are shunted by a suitable deflecting chute from a conveyor of a machine for loading vials or machines which have sterilized or otherwise treated empty vials. To one side, at turntable level, there is a shelf which for a portion of the arc of the turntable is flush therewith and, of course, curved to correspond to turntable radius. This shelf extends on a sufficient distance to accommodate a tray, preferably in a suitable depression so that the bottom of a three-sided tray will be flush with turntable level. The remainder of turntable periphery, except for filling chute entrance, is provided with a suitable wall sufficiently high so that vials cannot slip off the turntable; the wall is, of course, stationary. The shelf is also provided with two walls, one extending along tangent to the turntable circumference and the other one meeting it and being in effect a continuation of the turntable surrounding wall. A movable rake, preferably sliding on a rod, is provided which can be actuated manually or mechanically which slides along the wall of the shelf extending tangent to the turntable periphery. The travel of the rake is such that when it is moved to its extreme position it is just inside the open end of a three-sided tray for receiving the containers for mechanical operation or to the closed end for manual operation.

The turntable is continuously filled or refilled with containers from the deflection chute; and when the rake is at the end of the tangent wall, as the turntable rotates containers are pushed off the periphery behind the rake and also on the portion of the turntable behind the rake. When this portion is filled, the rake is moved manually or mechanically along the tangent wall, pushing the containers in front of it onto the open tray. After the tray is filled with containers, the rake is moved slightly back, and a suitable wedge or other holder inserted into the open end of the tray so that vials cannot fall out. For manual operation several strokes of the rake may be used if desired. The tray is then removed and an empty tray replaced. A suitable stop is provided at the back of the depressed portion of the shelf so that the back wall of the tray is properly placed. After removing the filled tray and replacing with an empty tray, the rake is then moved to its starting position, containers begin to accumulate in front of it, as described above, and when the space is full the rake can again move along the tangent wall to fill the new tray with vials.

The rake may be moved either manually or mechanically. The particular moving means for the rake form no part of the present invention except insofar as they must be suitable for the back and forth movement of the rake tangent to the periphery of the turntable.

As containers are fed to the turntable at its periphery, when the rake is moved back onto the turntable some of the containers are pushed back and come further into the middle of the turntable. If desired the rake can be raised on its back travel and lowered into a new position. In either case, when the rake is in its position for receiving containers the continued rotation of the turntable fills up the space in front of it.

It is an advantage of the invention that it may be used with containers which are full or empty, capped tightly, or loosely where freeze drying of the container contents is necessary; and the machanism is therefore useful with any kind of a machine which moves containers, whether full or empty, single file. Ordinarily the conveyor moves a single file of containers, although in some machines it is possible that a double or multiple file may move. The present invention is applicable to any of these types of container movement, of course the filling chute to the turntable being of suitable dimensions for the vials, or if more than a single file is used for the requisite number of files.

BRIEF DESCRIPTION OF THE DRAWINGS

FIGURES 1 to 5 are plan views of the turntable and loader in various positions,
FIGURE 6 is a section through a tray with some vials in place. The drawing showing the rake part way to its extreme travel, and
FIGURE 7 is a section along the lines 7—7 of FIGURE 1.

DESCRIPTION OF THE PREFERRED EMBODIMENTS

Figure 1:
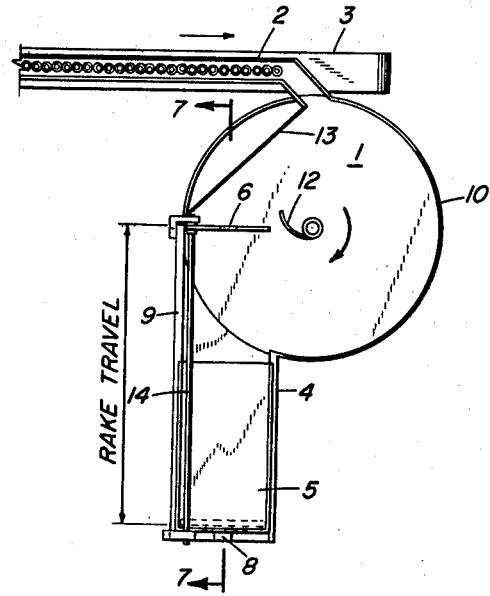

In FIGURES 1 to 5 a slowly rotating turntable is shown at 1 turning in the direction of the curved arrow. It is provided with a baffle 12 to urge containers toward the periphery and is surrounded by a wall 10 except for an opening where a filling chute 2 deflects containers from a moving conveyor 3 and also for a portion of the periphery taken up by a shelf 4.

The shelf is provided with a depression 11, as can be seen from FIGURES 6 and 7, in which a tray 5 fits, being held at its rear by a tray stop 8. The tray is a three-sided tray open at one end. A tangential wall 9 extends along the shelf tangent to the periphery of the turntable, the surrounding wall of the turntable stopping at the other side of the shelf and providing an open portion flush with the turntable and having a width suitable for the size of tray used.

A movable rake 6 is provided which can slide on a rod 14 along the wall 9 parallel thereto. This rake may be moved manually or automatically, the means for moving it forming no part of the present invention. In FIGURE 1 the turntable is shown empty, although in operation, as will be apparent from FIGURES 2 to 5, it always has some containers on it.

Figure 2:
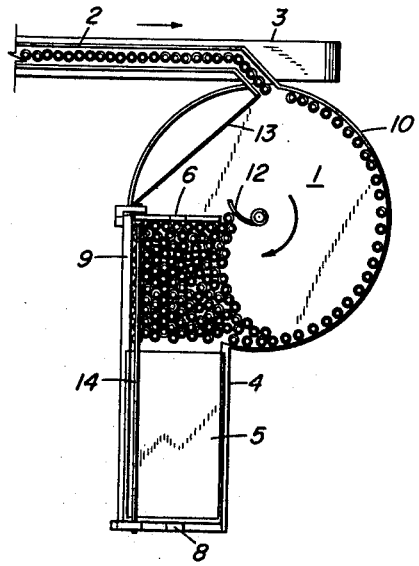
Figure 3:
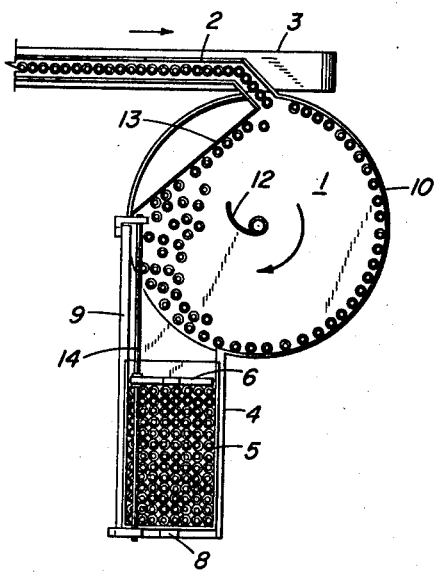
Figure 4:
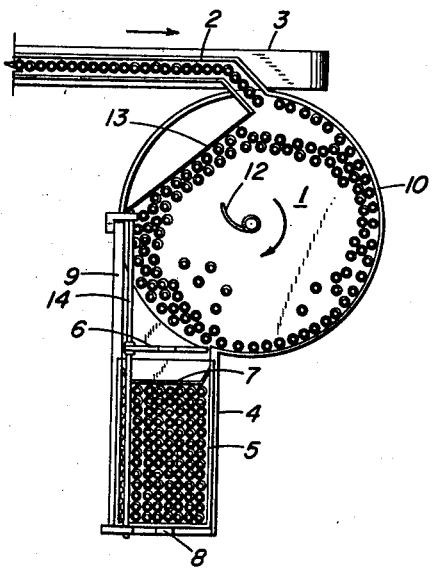

In FIGURE 1 the rake 6 is shown in one extreme position, and as the turntable 1 turns, containers deflected by the chute 2 move around the periphery of the turntable, being urged toward the periphery by the baffle 12. Baffle 13 deflects the vials away from the periphery of the turntable. As the containers reach the open portion in the wall at the end of the shelf, the containers back up behind the rake 6 and some of them move over onto the flush portion of the shelf. This is shown in FIGURE 2. For simplicity only a few of the containers are shown in order not to confuse the drawing. When the turntable has turned sufficiently so that the space in front of the rake 6 is full of containers, the rake is moved down to the end of the tray, as is shown in FIGURE 3, the containers being moved in front of it and filling up the tray.

After the tray is full, the rake 6 is moved slightly back and a wedge or other holder 7 is placed in the open end of the tray to prevent vials from falling out. The full tray is then removed, an empty tray replaced, as shown in FIGURE 5, and now the rake is moved back to its position in FIGURE 1. It may be moved along the shelf and turntable, pushing some containers with it which are then distributed to the periphery of the turntable as it turns by means of the flexible baffle 12. It is also possible, of course, with manual operation to lift the rake up sufficiently so that it does not push vials back when it is moved to the position as shown in FIGURE 1. In the case of automatic drive, such a raising can also be effected, but as it merely complicates the operation without being necessary ordinarily such a raising mechanism is not used. With manual operation the rake may be moved several times. With mechanical operation the rake normally moves once as soon as the space in front of the rake is filled with vials.

When the rake 6 has been returned to the position shown in FIGURE 1 with a fresh empty tray, the tray is filled by a repetition of the operations which have been described above.

Since the exact structural design of the rake is of little or no concern with the invention, it is shown semidiagrammatically. Of course for manual operation a suitable handle or grip can be provided, and if automatic operation is to be used a suitable drive means, (not shown), is provided.

The exact means of moving the rake forms no part of the present invention except, of course, that the rake must be movable on the rod 14 tangentially along the wall 9.

What is claimed is:
1. A rake type tray loader comprising in combination
   (a) a horizontal rotating turntable,
   (b) means for introducing containers onto the turntable surface,
   (c) a wall surrounding portions of the turntable to prevent containers falling off, the wall being interrupted only at the point where the containers are fed onto the turntable and another point for a sufficient distance to correspond to the width of a tray to be loaded,
   (d) a shelf at the second interruption of the wall having a wall running tangentially to the turntable and a portion at least flush with the turntable,
   (e) tray supporting means on said shelf positioned to support a three-sided tray with an open side toward the turntable, the bottom of the tray being flush with the turntable level, and
   (f) a rake of tray-width length movable along the wall tangent to the turntable, the travel of said rake being sufficient to move containers from the turntable into the tray to substantially fill the latter, whereby rotation of the turntable moves containers delivered thereto in front of the rake and on movement thereof into the tray.

2. A tray loader according to claim 1 in which the turntable is provided with a baffle extending out from its center toward its periphery and positioned so that containers being delivered to the turntable are urged toward the periphery thereof.

3. A tray loader according to claim 2 in which the shelf is provided with a recessed portion and a stop capable of receiving an empty tray and positioning its bottom flush with the level of the turntable.

References Cited

UNITED STATES PATENTS

| 1,740,893 | 12/1929 | Hoyt et al. | 53—159 |
| 2,883,812 | 4/1959 | Pechy | 53—164 |

THERON E. CONDON, Primary Examiner

R. L. SPRUILL, Assistant Examiner

U.S. Cl. X.R.

53—390